United States Patent [19]

Giordano

[11] 4,094,787

[45] June 13, 1978

[54] FILTER FOR PAINT OR OTHER LIQUIDS

[76] Inventor: Costanzo Giordano, 12820 S. Laflin, Chicago, Ill. 60643

[21] Appl. No.: 747,787

[22] Filed: Dec. 6, 1976

[51] Int. Cl.² .............................................. B01D 33/38
[52] U.S. Cl. .................................. 210/103; 210/108; 210/138
[58] Field of Search ............... 210/106, 108, 167, 192, 210/333, 408, 414, 497, 411, DIG. 8, 103; 134/104, 109, 111

[56] References Cited

U.S. PATENT DOCUMENTS

| | | | |
|---|---|---|---|
| 748,821 | 1/1904 | Wackeron | 210/411 |
| 785,522 | 3/1905 | Robinson | 210/414 |
| 1,843,157 | 2/1932 | Have | 210/167 |
| 2,889,048 | 6/1959 | Nordin | 210/414 X |
| 3,061,102 | 10/1962 | Mayen, Jr. | 210/414 X |
| 3,253,431 | 5/1966 | Minhinnett | 210/167 |
| 3,378,143 | 4/1968 | Tippiz | 210/411 |
| 3,478,883 | 11/1969 | Deluca, Jr. | 210/108 |

*Primary Examiner*—Theodore A. Granger
*Attorney, Agent, or Firm*—Burmeister, York, Palmatier, Hamby & Jones

[57] ABSTRACT

The disclosed filter comprises a filter housing having a generally conical downwardly tapering bottom wall and a closed top wall. A generally conical filter medium is mounted in the housing so as to partition the housing into upper and lower compartments. Rather than being conical, the filter medium may be in the shape of a downwardly tapering inverted pyramid, having any desired number of sides, with its apex down and its base at the top of the filter medium. During the normal filtering operation, paint or some other liquid is supplied under pressure to a lower opening at the lower end of the conical bottom wall. The paint or other liquid passes upwardly through the filter medium which removes any foreign particles. The filtered liquid or filtrate then passes out of the upper compartment through an outlet pipe extending from the lower portion of the upper compartment through the top wall and out of the housing. A control valve is provided to disconnect the paint supply from the lower opening and to connect the lower opening to a drain. This valve is actuated when the filter medium is to be cleaned. To clean the filter medium, a solvent is supplied to spray means in the upper compartment, so that the solvent will pass through the filter medium into the lower compartment and out of the housing through the control valve to the drain. The paint and the solvent may be supplied by a paint supply pump and a solvent supply pump. A second control valve may be connected into the outlet pipe. Preferably, a wash cycle is initiated automatically by a pressure sensor which is operated by excess paint pressure due to clogging of the filter medium. The pressure sensor causes the operation of a control system which initiates a wash cycle so as to stop the paint supply pump, actuate the first control valve, close the second valve, and start the solvent supply pump. The control system preferably includes a timer for terminating the wash cycle so as to stop the solvent supply pump, open the second control valve, deactuate the first control valve, and start the paint supply pump.

14 Claims, 1 Drawing Figure

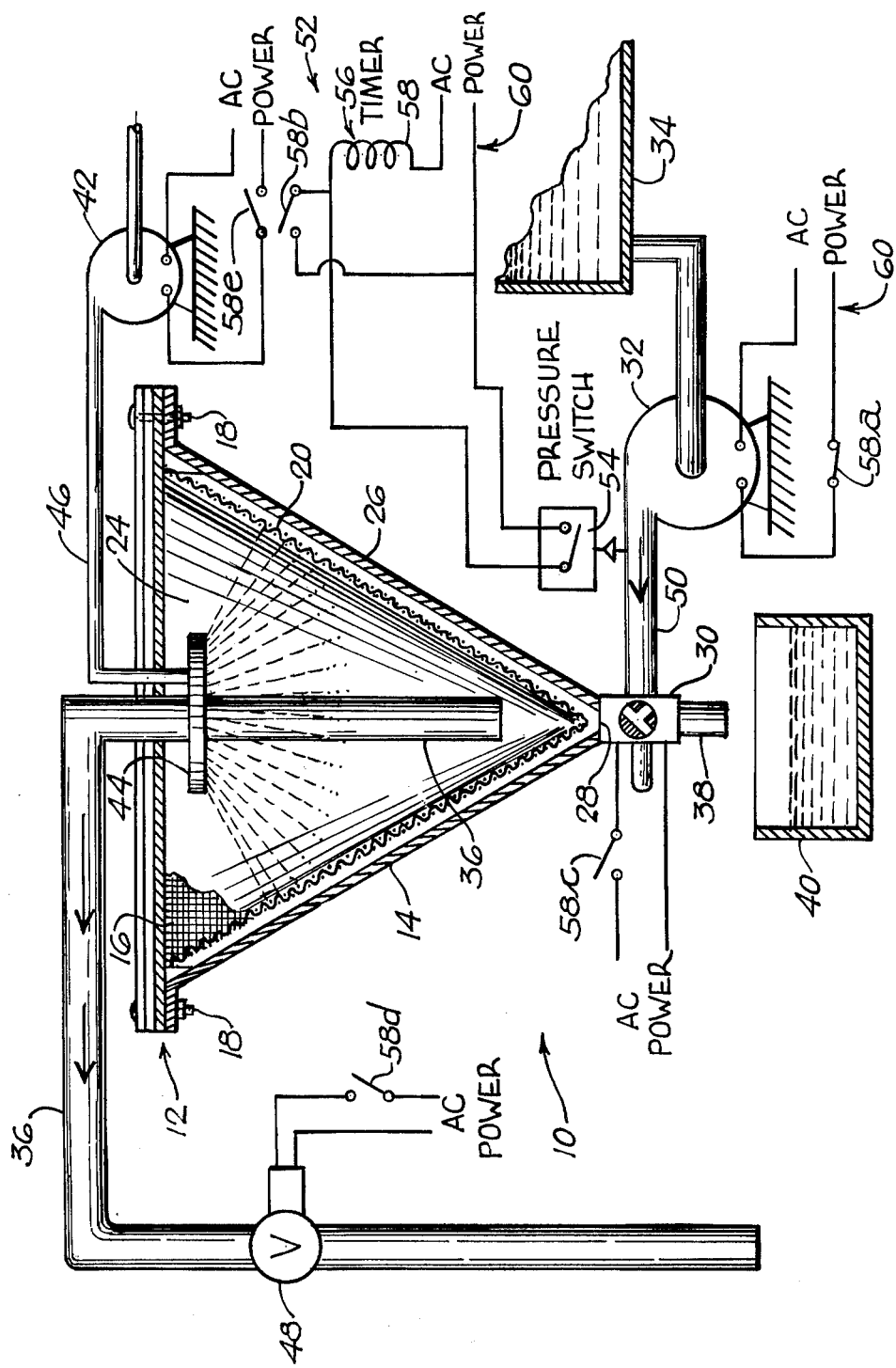

FILTER FOR PAINT OR OTHER LIQUIDS

This invention relates to a filter for removing foreign particles or material from paint or other liquids.

One object of the present invention is to provide a filter which can be cleaned very easily, when necessary, by backwashing the filter with a solvent.

A further object is to provide a new and improved filter in which the washing operation is carried out automatically.

To accomplish these objects, the present invention preferably provides a filter having a filter housing with a downwardly tapering bottom wall and a closed top wall. A downwardly tapering filter medium is mounted in the housing so as to partition the housing into upper and lower compartments. The filter medium is preferably in the general form of an inverted cone, but may also be in the shape of a downwardly tapering inverted pyramid having any desired number of sides, with its apex down and its base at the top.

The filter medium may be made of wire mesh or fabric, for example. A lower opening connects with the lower compartment, adjacent the lower end of the downwardly tapering bottom wall, to admit the paint or other liquid during the normal filtering operation. The liquid is supplied under pressure by liquid supply means, preferably through a control valve. Due to the pressure, the paint passes upwardly through the filter medium, into the upper compartment, and then out of the upper compartment through an outlet pipe, which extends through the top wall. When the filter medium needs cleaning, the control valve is actuated so as to disconnect the lower opening from liquid supply means, while connecting the lower opening to a drain. A solvent is then supplied by solvent supply means to spray means in the upper compartment, so as to wash the filter medium with a spray of the solvent. The solvent passes downwardly through the filter medium into the lower compartment and out of the housing through the control valve to the drain. When the filter medium has been washed, the solvent supply means is stopped, and the control valve is deactuated to resume the supply of the liquid to the housing.

The paint or other liquid is preferably supplied by a liquid supply pump, connected to the control valve. A solvent supply pump is preferably employed to supply the solvent to the spray means, which may be in the form of a spray head in the upper compartment. A second control valve is preferably connected into the outlet pipe.

The wash cycle is preferably initiated in response to a pressure sensor which is operated by increased pressure due to clogging of the filter medium. Automatic operation is preferably brought about by control means operated by the pressure sensor to initiate the wash cycle. The control means is preferably operative to stop the liquid supply pump, operate the first control valve, close the second control valve and start the solvent supply pump. The control means may also include means such as a timer for terminating the wash cycle so as to stop the liquid supply pump, open the second control valve, deactuate the first control valve, and start the liquid supply pump.

Further objects, advantages and features of the present invention will appear from the following description, taken with the accompanying drawing, in which the single figure is a diagrammatic sectional view showing a filter to be described as an illustrative embodiment of the present invention.

As just indicated, the drawing illustrates a filter 10 for removing foreign particles or other material from paint or other liquids. The filter 10 may be employed very advantageously for filtering paint, just before the paint is fed into cans or other containers for shipment, sale and use.

The illustrated filter 10 comprises a filter housing 12 having a generally conical downwardly tapering bottom wall 14 and a closed top wall 16, which may be removably secured to the bottom wall 14, as by means of the illustrated bolts 18 or other fasteners. A filter medium 20 is mounted in the housing 12, so as to partition the housing into upper and lower compartments 24 and 26, above and below the filter medium 20. The illustrated filter medium 20 is generally conical and downwardly tapering in shape, and is spaced upwardly and inwardly from the conical bottom wall 14. Any suitable filter medium may be employed, such as fine wire mesh, which has the advantage of being strong mechanically, or fabric. The filter medium may have a skeletal supporting frame, as needed.

Instead of being generally conical, the filter medium 20 may be in the form of an inverted pyramid, with any desired number of sides, and with its apex down and its base up. The same applies to the bottom wall 14.

The paint or other liquid to be filtered is supplied to the housing 12 through a lower opening 28, connecting with the lower compartment 26, preferably at the lower end of the downwardly tapering bottom wall 14. To control the flow of the paint or other liquid, control means may be connected to the opening 28, such control means being shown as a three-way control valve 30. The paint or other liquid is supplied to the control valve 30 by liquid supply means, here shown as including a liquid supply pump 32, adapted to pump the liquid from a tank 34 or some other receptacle. control valve 30 and into the lower compartment 26. The pressure causes the paint to pass through the filter medium 20 into the upper compartment 24. Foreign particles and other foreign material are removed from the liquid by the filter medium 20.

The upper compartment 24 is provided with an outlet pipe 36 which extends through the top wall 16 and carries the paint or other liquid to the filling machine or station, where the paint is fed into cans or other receptacles for shipment, sale and use. As here shown, the outlet pipe 36 extends downwardly into the upper compartment 24 to a point near the lower extremity of the upper compartment. The pressure developed by the pump 32 is effective to force the paint or other liquid through the outlet pipe 36. Because of the arrangement of the outlet pipe 36, a pocket of compressed air is normally trapped in the upper portion of the upper compartment 24.

When the filter medium 20 needs to be cleaned, the liquid supply pump 32 is stopped so as to discontinue the flow of the liquid into the housing 12. The air pressure in the housing 12 causes most of the liquid to be discharged through the outlet pipe 36. The control valve 30 is then actuated or reversed so as to disconnect the inlet opening 28 from the liquid supply pump 32, while connecting the opening 28 to a drain 38, leading to any suitable receiver or waste receptacle 40.

A cleaning solvent is then supplied to the upper compartment 24 of the housing 12 by solvent supply means, here shown as including a solvent supply pump 42, adapted to supply the solvent to spray means 44 in the upper compartment 24. A solvent pipe 46 extends through the top wall 16 between the pump 42 and the spray means 44 which is shown in this case as a spray head, adapted to spray the solvent against the upper side of the filter medium 20. The solvent passes through the filter medium 20 and washes the foreign particles and other material away from the filter medium and into the lower compartment 26, and then out of the compartment 26 through the control valve 30 and the drain 38 to the waste receiver 40.

The washing solvent is of a type capable of washing away the paint or other liquid being filtered. For example, in the case of a water base paint, the solvent may be water or a water base cleaning solution. In the case of an oil base paint, the cleaning solvent may be a mineral spirit material, derived from petroleum.

It is preferred to provide a second control valve 48 in the outlet pipe 36, to close the outlet pipe during the wash cycle.

When the filter medium 20 has been washed sufficiently, the wash cycle is terminated by stopping the solvent supply pump 42, opening the second control valve 48, deactuating the first control valve 30, and starting the liquid supply pump 32, so that the paint or other liquid will again be supplied to the lower compartment 26 of the filter housing 12 through the valve 30. When the valve 30 is deactuated, it disconnects the opening 28 from the drain 38 and connects the opening to the liquid supply pump 32. A liquid pressure pipe 50 may be connected between the pump 32 and the three-way control valve 30.

It is preferred to provide a control system or means 52, for carrying out the wash cycle automatically, when needed. As the filter medium 20 becomes clogged, the pressure of the paint or other liquid builds up in the pressure pipe 50 and also in the lower compartment 26. This increased pressure may be employed to operate a pressure sensor, here shown as a pressure switch 54, connected to the pressure pipe 50 or the lower compartment 26. The operation of the pressure sensor 54 causes the control system 52 to initiate the wash cycle. The control system 52 may include means, here shown as a timer 56, for terminating the wash cycle. The illustrated timer 56 includes a motor coil 58 which is energized by the closure of the pressure switch 54, in response to increased liquid pressure. The energization of the timer 56 causes the opening of a pair of normally closed contacts 58a, and the closure of normally open contacts 58b, 58c, 58d and 58e.

The timer 56 is energized from a pair of alternating current (AC) power lines 60.

In this case, the contacts 58b are connected in parallel with the pressure switch 54, and thus serve as holding contacts which are closed at the initiation of the wash cycle and are opened by the timer 56 to terminate the wash cycle.

The normally closed contacts 58a are connected between the liquid supply pump 32 and the power lines 60 and are opened early in the wash cycle to discontinue the supply of the paint or other liquid to the filter housing 12.

The contacts 58c are connected between the three-way control valve 30 and the AC power lines 60, and are closed early in the wash cycle to connect the opening 28 to the drain 38, rather than to the liquid supply pipe 50.

The contacts 58d are connected between the second control valve 48 and the AC power lines 60 and are closed by the timer to close the valve 48 in the outlet pipe 36.

The contacts 58e are connected between the solvent supply pump 42 and the AC power lines 60 and are closed by the timer to start the solvent supply pump 42. The timer 56 may include a series of cams or any other suitable means for operating the contacts 58a–e.

After a properly predetermined timed interval, the timer 56 opens the contacts 58e, to stop the solvent supply motor 42; opens the contacts 58d, to open the second control valve 48 in the outlet pipe 36; opens the contacts 58c to deactuate the three-way control valve 30, so that it again connects the opening 28 to the liquid supply pipe 50, rather than the drain 38; closes the contacts 58a, so as to start the liquid supply pump 32; and opens the holding contacts 58b, so as to deenergize the timer 56.

It will be evident that the filter medium 20 is cleaned very easily and effectively. Moreover, the cleaning operation involves the loss of only a minimum amount of the paint or other liquid. The amount of solvent used is also minimized. Furthermore, the cleaning operation is carried out in a minimum amount of time.

I claim:

1. A filter device for paint or other liquid,
said filter device comprising a filter housing having a downwardly tapering bottom wall and a closed top wall,
said bottom wall being in the shape of an inverted cone,
a downwardly tapering filter medium mounted in said housing and partitioning said housing into upper and lower compartments,
said filter medium being in the shape of an inverted cone,
said upper compartment being disposed between said top wall and said filter medium,
said lower compartment being disposed between said filter medium and said bottom wall,
said housing having a lower opening communicating with said lower compartment at the lower end of said bottom wall and having appurtenant liquid inlet and drain means for connection to said lower opening,
an outlet pipe extending from said upper compartment and through said top wall,
a control valve connected to said lower opening and to said liquid inlet means and said drain means and selectively operable between first and second positions for switching said lower opening between said liquid inlet means and said drain means, respectively,
selectively operable liquid supply means for supplying the liquid under pressure to said liquid inlet means to cause the liquid to pass through said control valve and said filter medium into said upper compartment and out of said upper compartment through said outlet pipe to filter the liquid,
spray means in said upper compartment and directed toward said filter medium,
and selectively operable solvent supply means connected to said spray means for causing the solvent to be sprayed upon said filter medium and to pass through said filter medium into said lower compartment and through said control valve to said drain means to backwash said filter medium.

2. A filter device according to claim 1,
including a pressure sensor connected to said liquid supply means and operable by increased pressure therein due to clogging of said filter medium,
and control means operable by said pressure sensor for initiating a wash cycle so as to operate said control valve to said second position and to actuate said solvent supply means,
said control means including additional means for terminating the wash cycle so as to deactuate said solvent supply means and to operate said control valve to said first position.

3. A filter device according to claim 2,
in which said additional means includes a timer for terminating the wash cycle after a timed interval.

4. A filter device according to claim 2,
in which said liquid supply means includes a liquid supply pump for supplying the liquid to said control valve,
said control means including means for stopping said liquid supply pump at the initiation of the wash cycle and for starting said pump at the termination of said wash cycle.

5. A filter device according to claim 2,
in which said solvent supply means includes a solvent supply pump for supplying the solvent to said spray means,
said control means including means for starting said solvent supply pump for the initiation of the wash cycle and for stopping said supply pump for the termination of said cycle.

6. A filter device according to claim 2,
in which said outlet pipe is provided with a second control valve,
said second control means including means for closing said second control valve for the initiation of said wash cycle and for opening said second control valve for the termination of said cycle.

7. A filter device according to claim 1,
in which said filter medium comprises a wire mesh screen.

8. A filter device according to claim 1,
in which said spray means comprises a spray head disposed in said upper compartment.

9. A filter device according to claim 1,
in which said liquid supply means includes a liquid supply pump for supplying the liquid under pressure to said liquid inlet means,
said solvent supply means comprising a solvent supply pump for supplying solvent to said spray means,
said filter device including a pressure sensor operable by increased liquid pressure due to clogging of said filter medium,
and control means operable by said pressure sensor for initiating a wash cycle so as to stop said liquid supply pump, actuate said control valve to said second position and start said solvent supply pump,
said control means including additional means for terminating said wash cycle so as to stop said solvent supply pump, actuate said control valve to said first position and start said liquid supply pump.

10. A filter device according to claim 9,
including a second control valve connected into said outlet pipe,
said control means including additional means for closing said second control valve for the initiation of said wash cycle and for opening said second control valve for the termination of said wash cycle.

11. A filter device according to claim 1, in which said filter medium is made of fabric.

12. A filter device for paint or other liquid,
said filter device comprising a filter housing having a downwardly tapering bottom wall and a closed top wall,
said bottom wall being in the shape of an inverted cone,
a downwardly tapering filter medium mounted in said housing and partitioning said housing into upper and lower compartments,
said filter medium being in the shape of an inverted cone,
said upper compartment being disposed between said top wall and said filter medium,
said lower compartment being disposed between said filter medium and said bottom wall,
said housing having a lower opening communicating with said lower compartment at the lower end of said bottom wall and having appurtenant liquid inlet and drain means for connection to said lower opening,
an outlet pipe extending from said upper compartment and through said top wall,
a control valve connected to said lower opening and to said liquid inlet means and said drain means and selectively operable between first and second positions for switching said lower opening between said liquid inlet means and said drain means, respectively,
liquid supply means including a selectively operable liquid supply pump for supplying the liquid under pressure to said liquid inlet means to cause the liquid to pass through said control valve and said filter medium into said upper compartment and out of said upper compartment through said outlet pipe to filter the liquid,
spray means in said upper compartment and directed toward said filter medium,
solvent supply means including a selectively operable solvent supply pump connected to said spray means for causing a solvent to be sprayed upon said filter medium and to pass through said filter medium into said lower compartment and through said control valve to said drain means to backwash said filter medium,
pressure sensor means operable by increased liquid pressure from said liquid supply pump due to clogging of said filter medium,
and control means operable by said pressure sensor means for causing the stopping of said liquid supply pump followed by the operation of said control valve to said second position and the starting of said solvent supply pump to initiate a backwash cycle,
said control means including additional means for terminating said backwash cycle by causing the stopping of said solvent supply pump followed by the operation of said control valve to said first position and the starting of said liquid supply pump to resume liquid filtration.

13. A filter device according to claim 12,
including a second control valve connected into said outlet pipe,
said control means including means for closing said second control valve for the initiation of said backwash cycle and for opening said second control valve for the termination of the backwash cycle.

14. A filter device according to claim 12,
in which said additional means includes a timer for terminating the backwash cycle after a timed interval.

* * * * *

UNITED STATES PATENT OFFICE
CERTIFICATE OF CORRECTION

Patent No. 4,094,787      Dated June 13, 1978

Inventor(s) Costanzo Giordano

It is certified that error appears in the above-identified patent and that said Letters Patent are hereby corrected as shown below:

Column 2, line 38, change "receptacle.  control" so as to read --receptacle, through control--

Column 2, line 39, before "pressure" insert --pump--

Signed and Sealed this

Twenty-seventh Day of February 1979

[SEAL]

Attest:

RUTH C. MASON
Attesting Officer

DONALD W. BANNER
Commissioner of Patents and Trademarks